United States Patent [19]
Sezaki et al.

[11] Patent Number: 5,028,662
[45] Date of Patent: Jul. 2, 1991

[54] THERMOPLASTIC ELASTOMER COMPOSITION

[75] Inventors: Eiji Sezaki; Masatoshi Isono, both of Kanagawa; Masatoshi Akami; Hisafumi Endo, both of Yokohama, all of Japan

[73] Assignee: Advanced Elastomer Systems, L.P., St. Louis, Mo.

[21] Appl. No.: 358,996

[22] Filed: May 26, 1989

[30] Foreign Application Priority Data

Jul. 27, 1988 [JP] Japan .................................. 63-187578

[51] Int. Cl.$^5$ ........................ C08F 8/00; C08L 27/04
[52] U.S. Cl. ..................................... 525/194; 525/213
[58] Field of Search ................................ 525/231, 194

[56] References Cited

U.S. PATENT DOCUMENTS

| 3,806,556 | 4/1974 | Paleologo et al. |
| 4,100,123 | 7/1978 | Westermann ........................ 525/213 |
| 4,146,592 | 3/1979 | Kitagawa et al. ................... 525/213 |
| 4,247,652 | 1/1981 | Matsuda et al. |
| 4,593,062 | 6/1986 | Puydak et al. |
| 4,728,692 | 3/1988 | Sezaki et al. |
| 4,851,468 | 7/1989 | Hazelton et al. |

FOREIGN PATENT DOCUMENTS 2011430  7/1979  United Kingdom .

Primary Examiner—Bernard Lipman

[57] ABSTRACT

A thermoplastic elastomer composition prepared by dynamically vulcanizing a composition comprised (A) polyolefin 5-50 wt. parts, (B) brominated butyl rubber 5-50 wt. parts, (C) polychloroprene rubber 5-50 wt. parts and (D) process oil 10-50 wt. parts in the presence of peroxide is disclosed.

10 Claims, No Drawings

THERMOPLASTIC ELASTOMER COMPOSITION

DETAILED DESCRIPTION OF THE INVENTION

1. Technical Field

The present invention relates to a thermoplastic elastomer composition which is superior in mechanical strength, thermal stability, moldability, oil resistance, and durability.

2. Description Related Art

A thermoplastic elastomer is in general use for automotive parts etc., as an intermediate material of rubber and plastics and also as a replacement for rubber.

Heretofore, there have been proposed a variety of thermoplastic elastomers. For example, Japanese Patent Publication No. 34210/1978 discloses a thermoplastic composition composed of a partially crosslinked monoolefin copolymer rubber and a polyolefin resin, with the former being ethylene-propylene copolymer (EPM) or ethylenepropylene-nonconjugated diene terpolymer (EPDM), which is an elastomer, and the latter being polyethylene or polypropylene. The partial crosslinking is accomplished under dynamic conditions, usually under during mastication.

The above-mentioned composition composed of a partially crosslinked monoolefin copolymer rubber and a polyolefin resin has improved tensile characteristics, flexibility, and rebound resilience, but is unsatisfactory in moldability and long-term thermal resistance and stability. To overcome this disadvantage, there was proposed a process for producing a partially crosslinked thermoplastic elastomer composition which comprises heat-treating dynamically in the presence of an organic peroxide a mixture composed of (a) 90.40 parts by weight of peroxide-crosslinkable olefin copolymer rubber, (b) 10–60 parts by weight of peroxide-decomposable olefin plastics (with the total amount of (a) and (b) being 100 parts by weight), (c) 5.100 parts by weight of peroxidenoncrosslinkable hydrocarbon-based rubbery substance and/or (d) petroleum softener. (See Japanese Patent Publication No. 15741/1981). The typical examples of components (a), (b), and (c) are ethylene-propylene copolymer rubber or ethylene-propylene-nonconjugated diene copolymer rubber, isotactic polypropylene, and polyisobutylene or butyl rubber, respectively.

A disadvantage of this composition is that the ethylene-propylene copolymer rubber or ethylene-propylenenonconjugated diene copolymer rubber is crosslinked by a peroxide, whereas the polyisobutylene or butyl rubber is not crosslinked but undergoes molecular fission. Therefore, the composition is poor in mechanical strength, moldability, permanent compression set, and heat resistance.

To overcome this disadvantage, there was proposed a thermoplastic elastomer composition which is partially crosslinked with a metal oxide and/or metal chloride in place of an organic peroxide. (See Japanese Patent Laidopen No. 291639/1986). According to this disclosure, the composition is composed of (A) 10~90 parts by weight of crystalline polypropylene, (B) 10~90 parts by weight of halogenated (chlorinated) butyl rubber (with the total amount of (A) and (B) being 100 parts by weight), (C) 10 to 120 parts by weight of olefin copolymer rubber, and (D) 1~90 parts by weight of modified polyolefin.

This composition has a disadvantage of being poor in mechanical strength because the chlorinated butyl rubber alone is crosslinked by ZnO or ZnCl$_2$. For the composition to have improved mechanical strength, it is necessary that the olefin copolymer rubber (such as EPDM) be also crosslinked. This is accomplished only by the use of an organic peroxide. Unfortunately, an organic peroxide does not crosslink the chlorinated butyl rubber but causes molecular fission, resulting in a great decrease in mechanical strength, modulus, and moldability.

In view of the foregoing, the present applicant proposed a thermoplastic elastomer composition having superior mechanical strength which is incorporated with brominated butyl rubber in place of chlorinated butyl rubber and is crosslinked with a peroxide. This composition is based on the finding that unlike chlorinated butyl rubber, brominated butyl rubber can be crosslinked by a peroxide without molecular fission. This composition comprises (A) 10~90 parts by weight of crystalline polypropylene, (B) 10~90 parts by weight of brominated butyl rubber, (C) 10~120 parts by weight of olefin copolymer rubber for 100 parts by weight of the total amount of (A) and (B), and (D) 10~150 parts by weight of petroleum softener for 100 parts by weight of the total amount of (A) and (B), said composition being crosslinked by a peroxide crosslinking agent. (See Japanese Patent Application No. 085530/1987).

It is known that a blend of thermoplastic olefin resin and two rubber components (especially halogenated butyl rubber and polychloroprene) provides a thermoplastic olefin polymer composition having good physical strength, processability, flowability, and oil resistance, and low permanent compression set. For example, Japanese Patent Laid-open No. 148246/1986 discloses a thermoplastic elastomer composition which comprises (A) a polyolefin resin, (B) halogenated (chlorinated or brominated) butyl rubber, and (C) polychloroprene rubber, said composition being partially crosslinked with a metal oxide (ZnO).

The above-mentioned thermoplastic elastomer composition which is partially crosslinked with a metal oxide (ZnO) is superior in oil resistance but is liable to degradation due to moisture absorption, because ZnO is deliquescent.

It is an object of the present invention to provide a thermoplastic elastomer composition which has improved mechanical strength, elasticity, moldability, long term thermal stability, gas impermeability, damping properties, oil resistance, and durability.

SUMMARY OF THE INVENTION

The thermoplastic elastomer composition of the present invention has the above-mentioned improved properties because it contains chloroprene rubber and is crosslinked with a peroxide.

To achieve the above-mentioned object, the present inventors carried out a series of researches which led to a finding that a thermoplastic elastomer composition has superior oil resistance and durability when it contains brominated butyl rubber (which is compatible with a polyolefin and can be crosslinked by a peroxide without molecular fission) and chloroprene rubber (which has superior oil resistance and durability) and is crosslinked with a peroxide. The present invention was completed on the basis of this finding.

The gist of the present invention resides in a thermoplastic elastomer composition which comprises (A) 5 to 50 parts by weight of polyolefin, (B) 5 to 50 parts by weight of brominated butyl rubber, (C) 5 to 50 parts by weight of chloroprene rubber, and (D) 10 to 50 parts by weight of petroleum softener, said composition being formed by crosslinking in the presence of a peroxide crosslinking agent.

DETAILED DESCRIPTION

The thermoplastic elastomer composition of the present invention is composed of the components which are explained in the following.

(A) Polyolefin

The polyolefin (component A) is a homopolymer or copolymer of α-olefins such as ethylene, propylene, 1-butene, 1-hexene, and 4-methyl-1-pentene. It should preferably be crystalline polypropylene. The term "crystalline polypropylene" as used in this specification denotes both the homopolymer of propylene and the copolymer of propylene and the above-mentioned α-olefins. It should have a melt flow rate (MFR for short hereinafter) of 0.3 to 60 g/10min, preferably 1 to 40 g/10 min, and more preferably 3 to 30 g/10 min. The copolymer should contain more than 60 wt% of propylene. The crystalline polypropylene has the highest melting point among polyolefins. It contributes to the improvement of heat resistance and mechanical strength.

The above-mentioned polyolefins may be used alone or in combination with one another as component A. The content of component A should be 5 to 50 parts by weight, preferably 5 to 40 parts by weight.

(B) Brominated butyl rubber

The brominated butyl rubber (component B) is brominated isobutylene-isoprene copolymer rubber. It should contain more than 0.5 wt% of bromine, preferably 0.5 to 8 wt%, and most desirably 0.5 to 4.0 wt%. With a bromine content less than 0.5 wt%, it is not completely crosslinked due to molecular fission. In addition, it should preferably have a Mooney viscosity of $ML_{1+8}$ (100° C.) of 30 to 100 and a degree of unsaturation of 0.5 to 4.0 mol%.

It was found that brominated butyl rubber differs markedly from chlorinated butyl rubber in crosslinking properties although they are both halogenated butyl rubber. That is, the latter cannot be crosslinked by a peroxide on account of molecular fission, whereas the former forms crosslinked rubber which disperses into the composition, imparting heat resistance, damping properties, and gas impermeability to the composition, and also plays a role of binder at the interface between the polyolefin phase and the chloroprene phase. In other words, the brominated butyl rubber makes chloroprene rubber miscible with the polyolefin. The content of component B should be 5 to 50 parts by weight. With a content less than 5 parts by weight, component B does not fully exhibit the above-mentioned characteristics. With a content in excess of 50 parts by weight, component B has an adverse effect on flowability and hence on moldability. A preferred content of component B is from 5 to 40 parts by weight.

(C) Chloroprene rubber

The chloroprene rubber (component C) contributes to the improvement of flexibility and oil resistance of the composition owing to its inherently superior oil resistance. It should preferably have a Mooney viscosity $ML_{1+4}$ (100° C.) of 20 to 120. The content of component C should be 5 to 50 parts by weight. With a content less than 5 parts by weight, component C does not impart sufficient oil resistance. With a content more than 50 parts by weight, component C has an adverse effect on the flowability and hence on moldability. A preferred content of component C is from 5 to 40 parts by weight.

(D) Petroleum softener

The petroleum softener is a high-boiling petroleum fraction. It is used to lower the intermolecular force of rubber when rubber is processed by rolling, thereby facilitating processing and helping the dispersion of carbon black or white carbon. It is also used to lower the hardness of vulcanized rubber, thereby increasing its flexibility and resilience and improving its moldability. It is classified as of paraffin type, naphthene type, and aromatic type. The content of the petroleum softener should be 10 to 50 parts by weight. With a content less than 10 parts by weight, it does not fully produce its effect; and with a content in excess of 50 parts by weight, it lowers the heat resistance and mechanical strength of the composition and also oozes out, impairing the appearance of the composition. A preferred content of the petroleum softener is from 5 to 40 parts by weight.

(E) Crosslinking agent

The crosslinking agent used in the present invention is a peroxide. It includes hydroperoxides, dialkyl peroxides, diacyl peroxides, ketal peroxides, ketone peroxides, carbonate peroxides, and ester peroxides. Examples of the peroxide include dicumyl peroxide, di-tert-butyl peroxide, 2,5-dimethyl-2,5-di-(tert-butyl-peroxy) hexane-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl peroxyisopropylcarbonate, diacetyl peroxide, lauroyl peroxide, and tert-butylcumyl peroxide.

In the case of a conventional composition like the one according to the present invention which contains brominated butyl rubber (which is a halogenated butyl rubber) but does not contain olefin copolymer rubber, crosslinking is accomplished by the aid of ZnO. This is because ZnO crosslinks halogenated butyl rubber but does not crosslink olefin copolymer rubber, and a peroxide crosslinks olefin copolymer rubber but does not crosslink a halogenated butyl rubber (due to molecular fission).

A disadvantage of ZnO is that it combines with Cl to form $ZnCl_2$ which remains in the composition, causing the degradation of the composition. In other words, $ZnCl_2$ increases the moisture absorption and lowers the durability of the resulting composition because of its high deliquescence. This disadvantage is eliminated in the present invention by employing brominated butyl rubber (as a halogenated butyl rubber) which is crosslinked by a peroxide without molecular fission, and also by employing a peroxide in place of ZnO. As the result, the present invention provides a pure composition having superior characteristic properties.

For the sufficient crosslinking of the brominated butyl rubber, the peroxide should be used in an amount of 0.05 parts by weight or more for 100 parts by weight of the total amount of components A, B, C, and D. The upper limit should preferably be 10 parts by weight, because excess peroxide brings about excessive crosslinking to decrease the flowability of the resulting composition. A preferred amount ranges from 0.1 to 5 parts by weight.

The crosslinking agent used in the present invention may be used in combination with one or more than one kind of crosslinking auxiliary. Examples of the crosslinking auxiliary include sulfur (as simple substance), organic and inorganic sulfur compounds, alkylphenol resin, formaldehyde resin, heat-reactive phenolic resin, triallyl cyanurate (TAC), triallyl isocyanurate (TAIC), ethylene glycol methacrylate (EDMA), trimethylol propane trimethacrylate (TMPT), and p-quinonedioxime (GMF). The crosslinking auxiliary should be used in an amount of 0.05 to 10 parts by weight, preferably 0.1 to 5 parts by weight for 100 parts by weight of the total amount of component A, B, C, and D.

(F) Unsaturated carboxylic acid-modified polyolefin

The unsaturated carboxylic acid-modified polyolefin (component F) is a polyolefin modified with an unsaturated carboxylic acid or anhydride thereof. Examples of the unsaturated carboxylic acid or anhydride thereof include monocarboxylic acids (such as acrylic acid and methacrylic acid), dicarboxylic acids (such as maleic acid, fumaric acid, and itaconic acid), and dicarboxylic anhydrides (such as maleic anhydride and itaconic anhydride. Preferable among them are dicarboxylic acids and anhydrides thereof.

The polyolefin to be modified with the unsaturated carboxylic acid or anhydride thereof includes homopolymers and copolymers of α-olefins as in the case of component A mentioned above.

The content of the unsaturated carboxylic acid or anhydride thereof should preferably be 0.1 to 10 wt% of the modified polyolefin (100 wt%). With a content less than 0.1 wt%, the resulting modified polyolefin does not sufficiently improve the compatibility of the polyolefin and brominated butyl rubber. With a content in excess of 10 wt%, the resulting modified polyolefin does not produce any additional effect but is wasted.

The composition of the present invention should be incorporated with component F in an amount of 2 to 40 parts by weight, preferably 2 to 20 parts by weight for 100 parts by weight of the total amount of components A, B, C, and D. With an amount less than 2 parts by weight, component F does not improve the mechanical strength of the resulting composition; and with an amount in excess of 40 parts by weight, component F does not produce any additional effect but is wasted.

Other components

The thermoplastic elastomer composition of the present invention may be incorporated with stabilizers (such as antioxidant, UV light absorber, and metal poison inhibitor), additives (such as slip agent, antistatic agent, electric properties improver, flame retardant, processability improver, and pigment), and inorganic fillers (such as talc, calcium sulfate, barium sulfate, mica, and calcium silicate), according to need.

The thermoplastic elastomer composition of the present invention can be produced by mixing the above-mentioned components and melting and kneading the resulting mixture for dynamic thermal treatment. The kneading may be accomplished by the use of open-type apparatus (such as mixing roll) or closed-type apparatus (such as Banbury mixer, single- or twin-screw extruder, kneader, and continuous mixer), which are known well. Preferable among them are closed-type apparatus. It is desirable to perform kneading under an environment of inert gas such as nitrogen and carbon dioxide gas. The kneading should be carried out for 1 to 10 minutes, preferably 2 to 5 minutes, at a temperature (usually 130 to 280.C, preferably 160 to 250.C) at which the half-life period of the organic peroxide to be used is 1 minute. It is desirable to mix the components for 1 to 10 minutes, add the crosslinking agent and other additives, and knead the resulting mixture for 1 to 10 minutes.

The thermoplastic elastomer composition obtained as mentioned above can be molded into any desired shapes by any apparatus commonly used for thermoplastic resins. It is suitable for extrusion molding and calendering, and especially for injection molding.

EXAMPLES

The invention will be described in more detail with reference to the following examples.

EXAMPLES 1 to 12

The thermoplastic elastomer composition was prepared from the following components according to the formulation shown in Table 1.

Component A: Polypropylene ("Y201" having an MFR of 1 g/10 min, made by Tonen Sekiyukagaku K.K.), referred to as "PP" hereinafter, or propylene-ethylene block copolymer ("BJ315" made by Tonen Sekiyukagaku K.K.), referred to as "PP-block" hereinafter.

Component B: Brominated butyl rubber ("Bromobutyl 2244" having a Mooney viscosity of $ML_{1+8}$ (125° C) of 47, a bromine content of 2 wt%, and a degree of unsaturation of 2 mol%, made by Exxon Chemical), referred to as "BrIIR" hereinafter.

Component C: Chloroprene rubber ("Denka Chloroprene M30" having a Mooney viscosity $ML_{1+4}$ (100° C.) of 38, made by Denki Kagaku Kogyo K.K.), referred to as "CR" hereinafter.

Component D: Naphthene-type process oil softener ("Sunsen 4240" made by Sun Oil Co. in the U.S.), referred to as "softener" hereinafter.

Crosslinking agent: 2,5-dimethyl-2,5-di(t-butylperoxy)hexane ("Perhexa 25B", made by Nippon Oils and Fats Co., Ltd.), referred to as "peroxide" hereinafter.

Crosslinking auxiliary: Trimethylolpropane trimethacrylate ("NK ester TMPT", made by Shin-Nakamura Kagaku K.K.), referred to as "TMPT", hereinafter.

Component F: Unsaturated carboxylic acid-modified propylene-ethylene block copolymer ("CMPC-800X" containing 0.3 wt% of acid added, made by Tonen Sekiyukagaku K.K.), referred to as "modified PP" hereinafter.

The formulation shown in Table 1 is expressed in terms of parts by weight. The total quantity of PP (or PP block), BrIIR, CR, and softener is 100 parts by weight. The quantities of peroxide, TMPT, and modified PP are based on the total quantity of PP (or PP block), BrIIR, CR, and softener which is 100 parts by weight.

At first, the above-mentioned components, excluding peroxide and TMPT, were preliminarily mixed by melting at 165.C for 1 to 5 minutes in a Banbury mixer. Then, the peroxide and TMPT were added, and mixing was continued at 175.C for 2 to 10 minutes. The resulting mixture was made into a sheet by injection molding and the sheet was cut into pellets. The pellets were made into test pieces for the measurement of the following properties.

(1) MFR: JIS K7210, 10-kg load, 230° C.

(2) Tensile strength and elongation at break: JIS K6301, No. 3 dumbbell, at a pulling rate of 500 mm/min.
(3) Spring hardness: JIS K6301, type A.
(4) Permanent compression set: JIS K6301, at 70° C, for 22 hours, 25% compression.
(5) Tear strength: JIS K6301, type B, at a pulling of 500 mm/min.
(6) Oil resistance: JIS K6301, JIS No. 3 oil, at 100° C. for 70 hours.
(7) Moisture absorption: volatile matter which vaporizes at 110° C. for 24 hours.

examined in the same manner as in Example 1. The results are shown in Table 1.

TABLE 1

| Example (Compar. Example) | 1 | 2 | 3 | 4 | 5 | 6 | 7 |
|---|---|---|---|---|---|---|---|
| Formulation | | | | | | | |
| PP | 21 | 21 | 10 | 40 | 21 | — | 21 |
| PP block | — | — | — | — | — | 21 | — |
| BrIIR | 21 | 10 | 25 | 20 | 16 | 21 | 21 |
| CR | 21 | 32 | 25 | 20 | 26 | 21 | 21 |
| Softener | 37 | 37 | 40 | 20 | 37 | 37 | 37 |
| Modified PP | — | — | — | — | — | — | 3 |
| EPR | — | — | — | — | — | — | — |
| Peroxide | 1.0 | 1.0 | 1.0 | 1.0 | 1.0 | 1.0 | 1.0 |
| TMPT | 0.6 | 0.6 | 0.6 | 0.6 | 0.6 | 0.6 | 0.6 |
| ZnO | — | — | — | — | — | — | — |
| Permalax | — | — | — | — | — | — | — |
| Physical properties | | | | | | | |
| MFR (g/10 min) | 10 | 15 | 7 | 20 | 10 | 10 | 10 |
| Tensile strength at break (kg/cm²) | 80 | 75 | 65 | 120 | 85 | 80 | 95 |
| Tensile elongation at break (%) | 250 | 250 | 200 | 300 | 230 | 250 | 300 |
| Spring hardness | 73 | 72 | 60 | 95 | 72 | 72 | 73 |
| Permanent compression set (%) | 35 | 37 | 30 | 45 | 35 | 35 | 35 |
| Tear strength (kg/cm²) | 30 | 32 | 35 | 50 | 33 | 30 | 40 |
| Oil resistance (%) | 40 | 30 | 40 | 20 | 35 | 42 | 40 |
| Moisture absorption (%) | 0.1 | 0.1 | 0.1 | 0.05 | 0.1 | 0.1 | 0.1 |

| Example (Compar. Example) | 8 | 9 | 10 | 11 | 12 | (1) | (2) |
|---|---|---|---|---|---|---|---|
| Formulation | | | | | | | |
| PP | 21 | 10 | 40 | 21 | — | 20 | 21 |
| PP block | — | — | — | — | 21 | — | — |
| BrIIR | 10 | 25 | 20 | 16 | 21 | — | 21 |
| CR | 32 | 25 | 20 | 26 | 21 | — | 21 |
| Softener | 37 | 40 | 20 | 37 | 37 | 20 | 37 |
| Modified PP | 3 | 3 | 3 | 10 | 20 | — | — |
| EPR | — | — | — | — | — | 60 | — |
| Peroxide | 1.0 | 1.0 | 1.0 | 1.0 | 1.0 | 1.0 | — |
| TMPT | 0.6 | 0.6 | 0.6 | 0.6 | 0.6 | 0.6 | — |
| ZnO | — | — | — | — | — | — | 4 |
| Permalax | — | — | — | — | — | — | 2 |
| Physical properties | | | | | | | |
| MFR (g/10 min) | 15 | 7 | 20 | 20 | 30 | 20 | 10 |
| Tensile strength at break (kg/cm²) | 90 | 80 | 135 | 110 | 130 | 70 | 74 |
| Tensile elongation at break (%) | 300 | 250 | 350 | 350 | 400 | 300 | 200 |
| Spring hardness | 72 | 60 | 95 | 85 | 95 | 72 | 72 |
| Permanent compression set (%) | 37 | 30 | 45 | 40 | 45 | 40 | 38 |
| Tear strength (kg/cm²) | 42 | 35 | 55 | 45 | 50 | 30 | 30 |
| Oil resistance (%) | 30 | 40 | 20 | 30 | 25 | 150 | 40 |
| Moisture absorption (%) | 0.1 | 0.1 | 0.05 | 0.1 | 0.05 | 0.1 | 2.0 |

COMPARATIVE EXAMPLE 1

The same procedure as in Example 1 was repeated except that component B was not used and component C (CR) was replaced by ethylene-propylene rubber (EPR). The test pieces were examined in the same manner as in Example 1. The results are shown in Table 1.

COMPARATIVE EXAMPLE 2

The same procedure as in Example 1 was repeated except that the crosslinking agent (peroxide) was replaced by ZnO and the crosslinking auxiliary (TMPT) was replaced by "Permalax" (dicatechol borate of di-o-triguanidine, made by DuPont). The test pieces were examined in the same manner as in Example 1. The results are shown in Table 1.

It is noted from Table 1 that the thermoplastic elastomer composition of the present invention, which contains brominated butyl rubber and chloroprene rubber and is crosslinked with a peroxide, is superior in oil resistance, moldability, mechanical strength, and durability (with very little moisture absorption).

Containing brominated utyl rubber that is crosslinked with a peroxide, and chloroprene rubber, the thermoplastic elastomer composition of the present invention has good flexibility, high mechanical strength, high rubber elasticity (small permanent compression set)), good long-term durability, good moldability, and superior oil resistance.

Because of good flexibility, strength, durability, and moldability, the thermoplastic elastomer composition can be easily made into automotive parts (such as rack and pinion boot, cable outer coating, spoiler, side protector, and bumper) by injection molding, blow molding, or extrusion molding.

What is claimed is:

1. A thermoplastic elastomer composition comprising...
   (A) 5 to 50 parts by weight of a crystalline polypropylene, (B) 5 to 50 parts by weight of brominated butyl rubber, (C) 5 to 50 parts by weight of chloroprene rubber, and (D) 10 to 50 parts by weight of petroleum softener, said brominated butyl rubber and said chloroprene rubber having been cross-linked in the presence of a peroxide crosslinking agent and in the presence of said polypropylene.

2. The thermoplastic elastomer composition according to claim 1, wherein the brominated butyl rubber contains from about 0.5 wt% to about 8 wt% of bromine.

3. The thermoplastic elastomer composition according to claim 1, which further comprises 2 to 40 parts by weight of an unsaturated carboxylic acid--modified polyolefin for 100 parts by weight of the total amount of components (A), (B), (C), and (D).

4. The thermoplastic elastomer composition according to claim 2, which further comprises 2 to 40 parts by weight of an unsaturated carboxylic acid-modified polyolefin for 100 parts by weight of the total amount of components (A), (B), (C), and (D).

5. The thermoplastic composition of claim 1 wherein said crystalline polypropylene is a homopolymer or copolymer of propylene having a melt flow rate of 0.3 to 60 grams per 10 minutes.

6. A method for producing a thermoplastics composition which comprises the steps of:
(a) mixing from about 5 to about 50 parts by weight of (A) a crystalline polypropylene, from about 5 to about 50 parts by weight of (B) brominated butyl rubber, from about 5 to about 50-- parts by weight of chloroprene rubber, and from about 10 to about 50 parts by weight of a petroleum softener; and
(b) at least partially crosslinking said brominated butyl rubber and said chloroprene rubber in said mixture in the presence of a peroxide crosslinking agent.

7. The method of claim 6 wherein the brominated butyl rubber contains from about 0.5 wt.% to about 8 wt. % bromine.

8. The method of claim 6 wherein said mixing step further comprises mixing with 2 to 40 parts by weight of an unsaturated carboxylic acid-modified polyolefin for 100 parts by weight of the total amount of components (A), (B), (C) and (D).

9. The thermoplastic elastomer composition of claim 1, wherein said composition is a dynamically vulcanized composition.

10. The method of claim 6, wherein said step (b) is conducted at dynamic volcanization conditions.

* * * * *